Aug. 11, 1970  J. BREAN  3,524,184
OPTICAL ENCODER
Filed Oct. 21, 1966  9 Sheets-Sheet 1
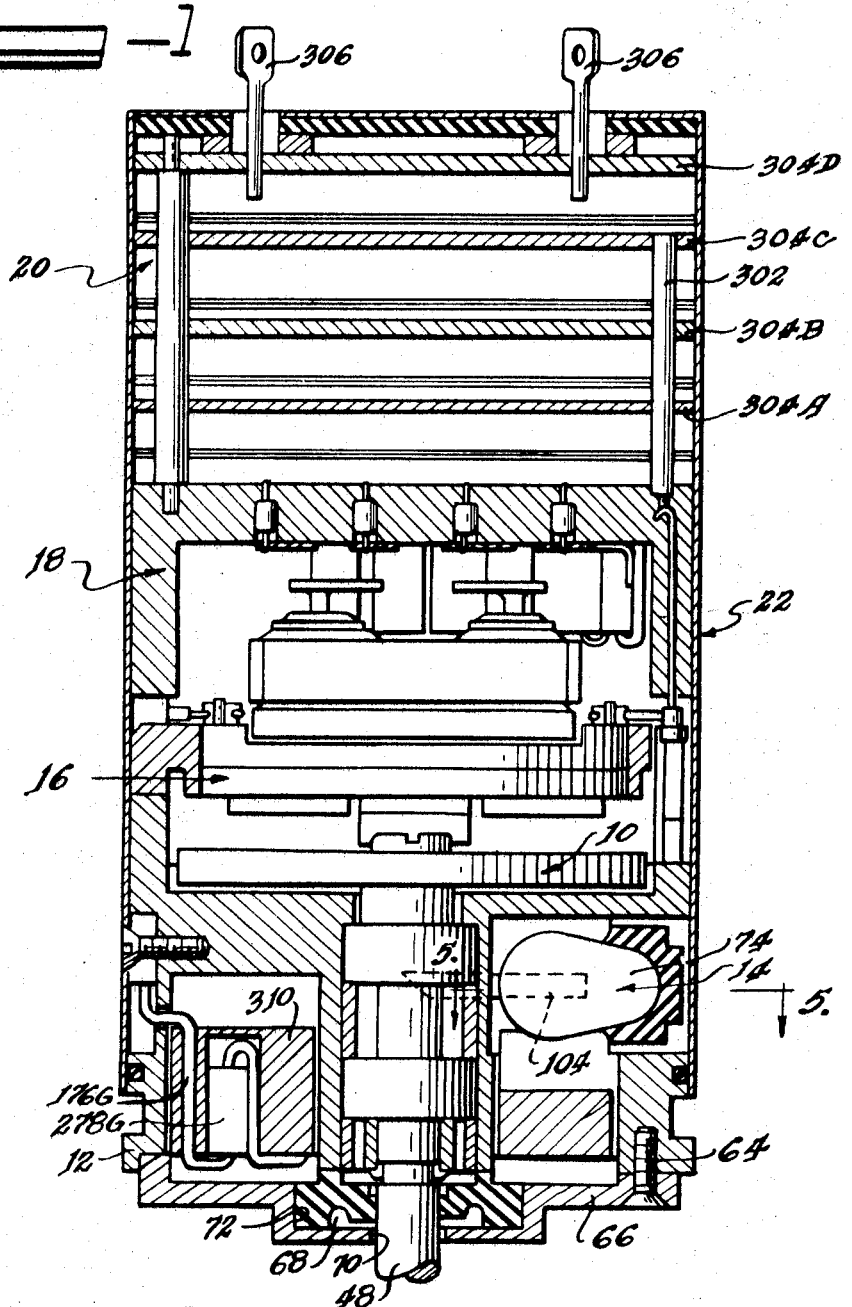
Inventor
By: John Brean
Burmeister & Kulie
Attorneys

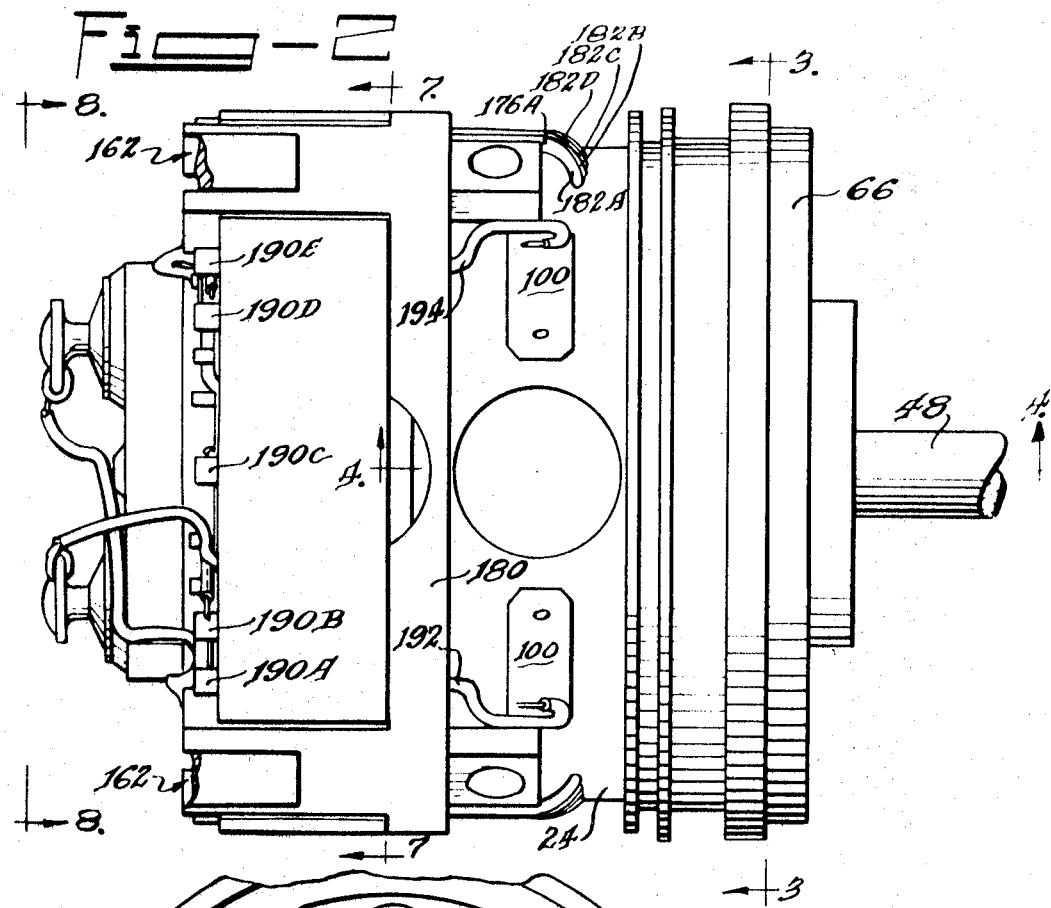
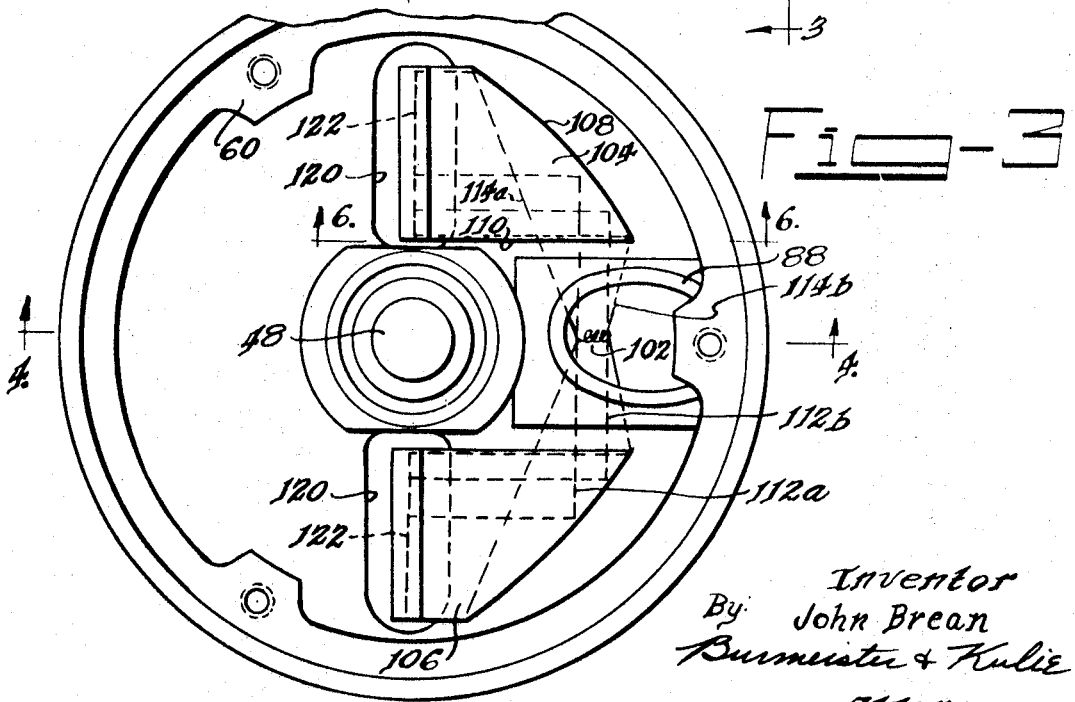

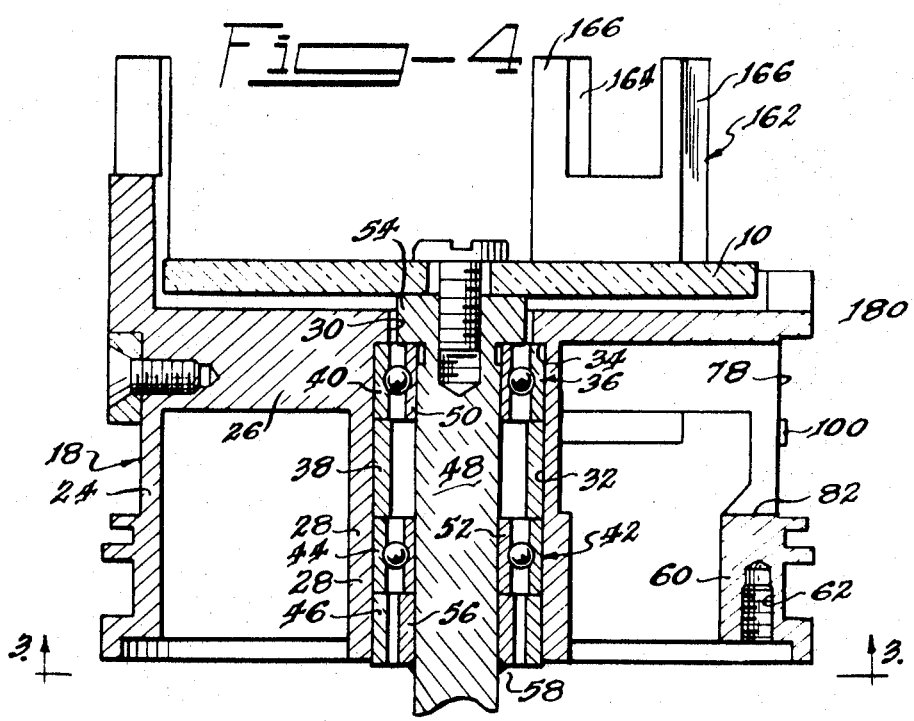
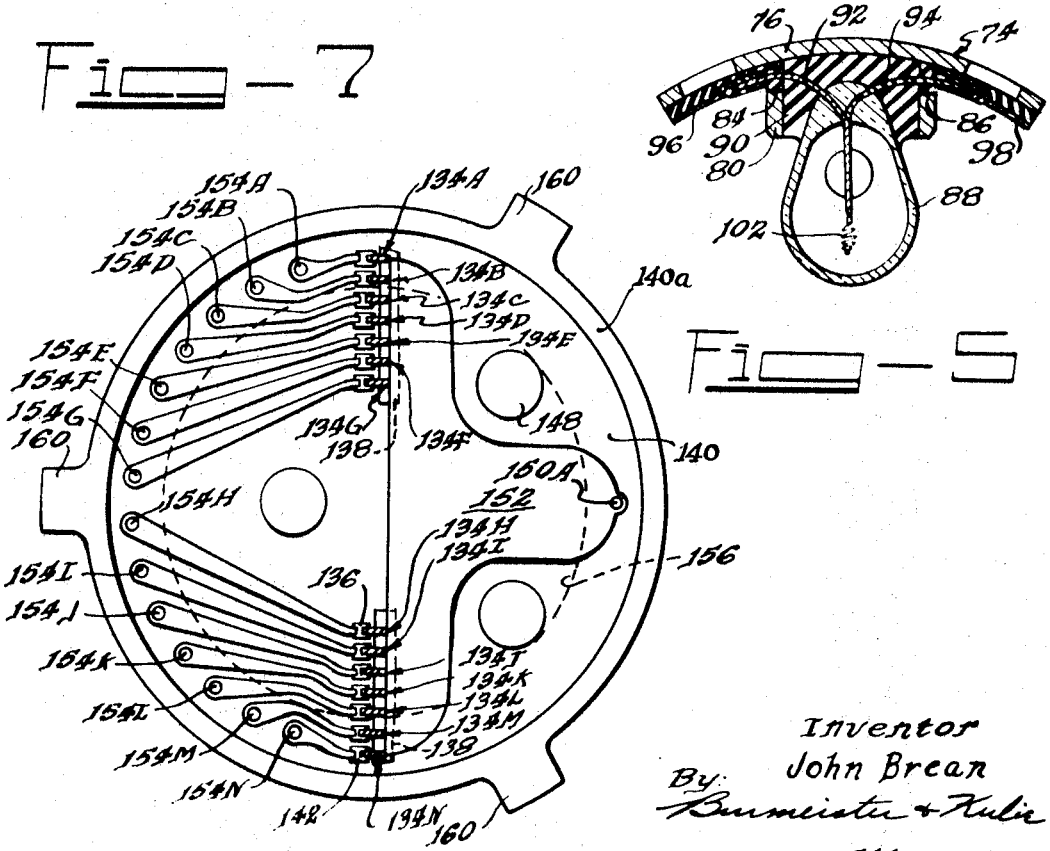

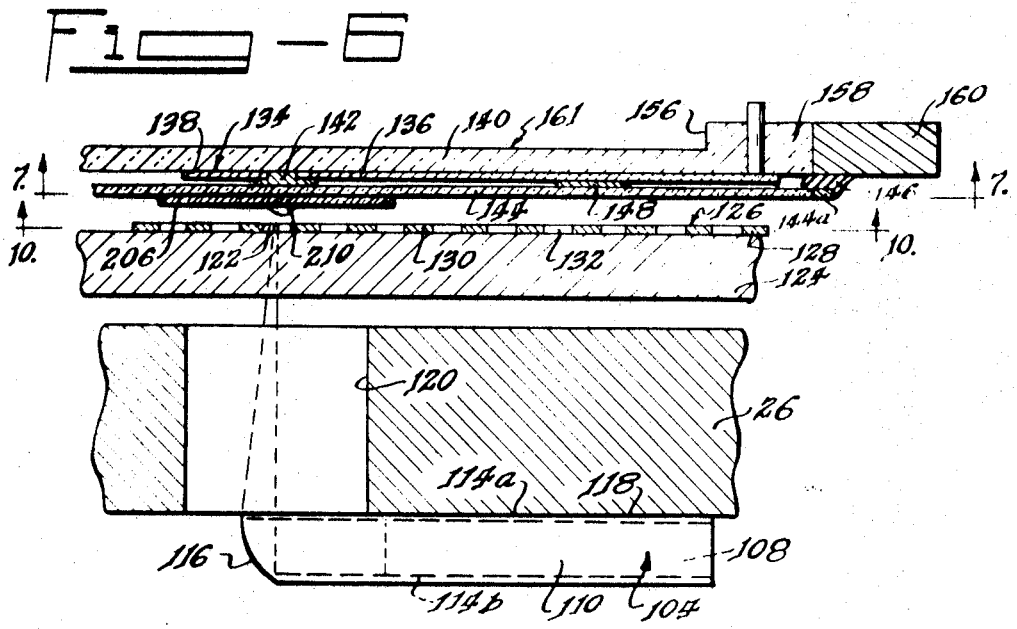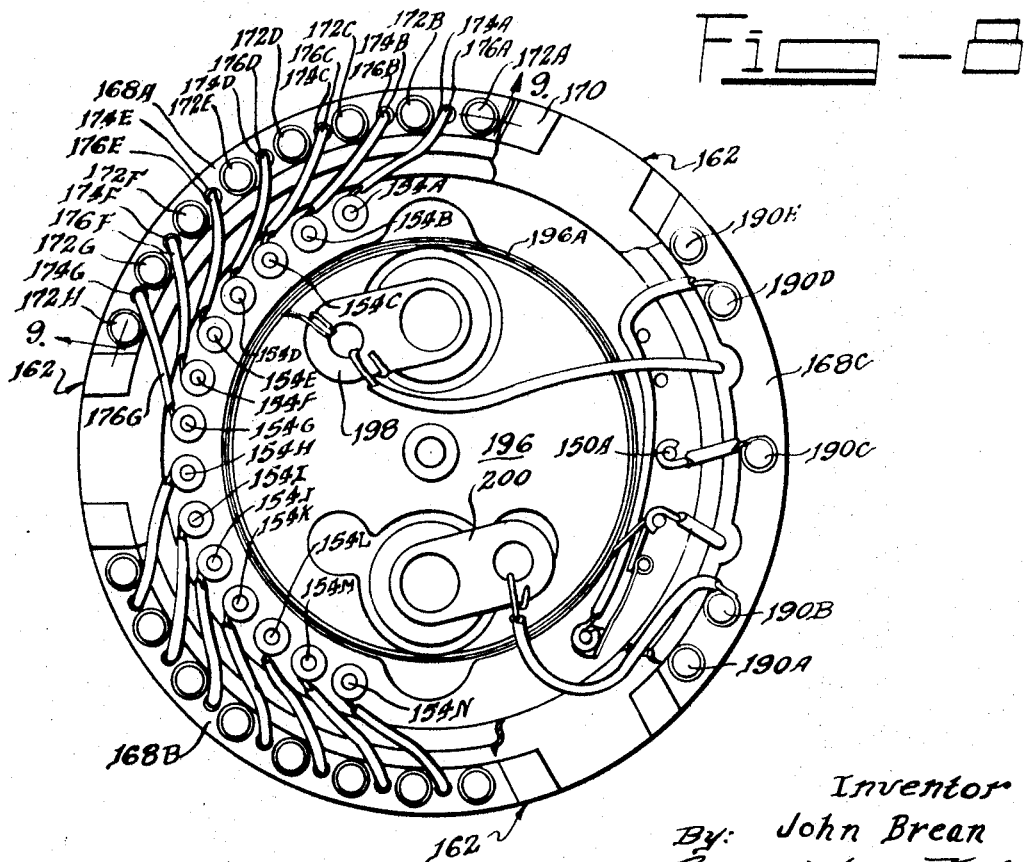

Aug. 11, 1970  J. BREAN  3,524,184
OPTICAL ENCODER
Filed Oct. 21, 1966  9 Sheets-Sheet 5
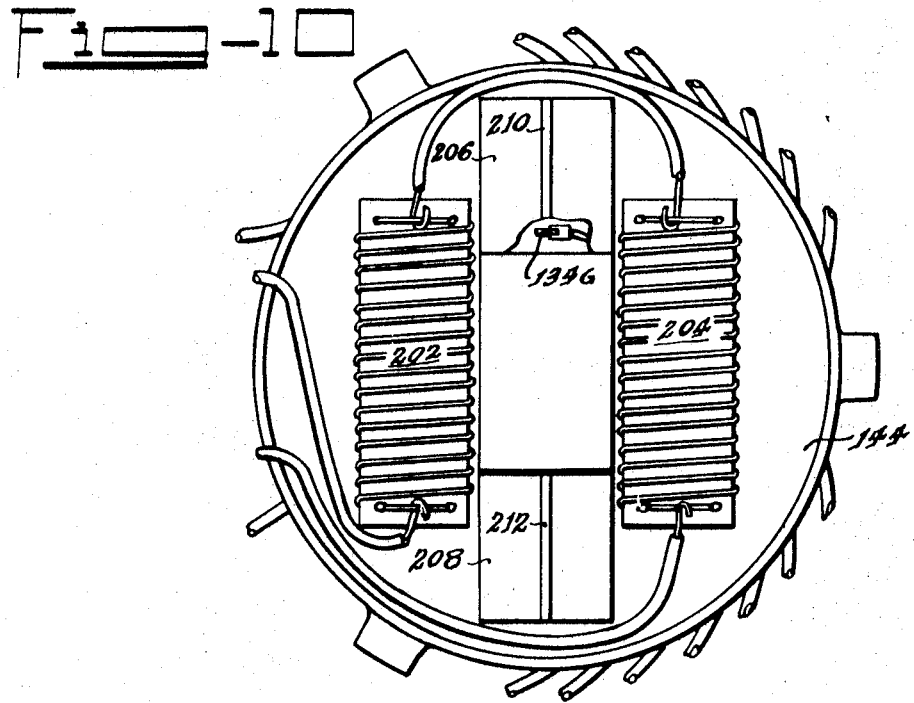
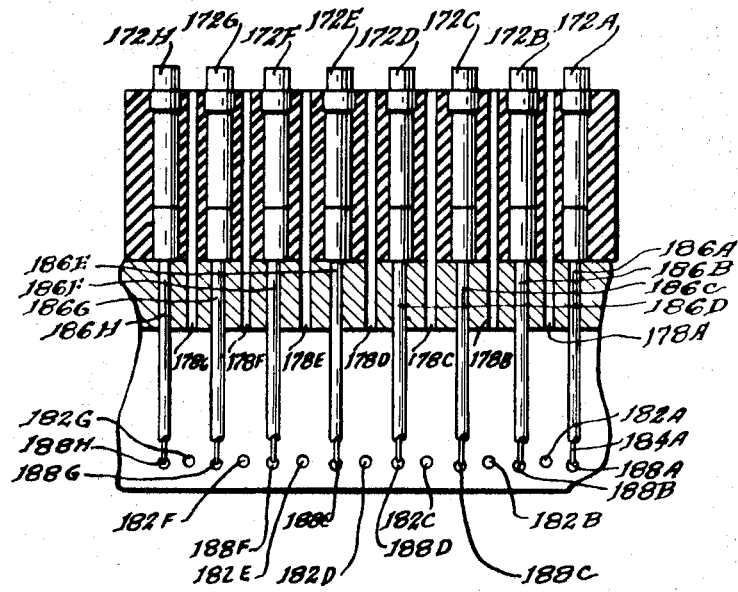
Inventor
John Brean
By Burmeister & Kulie
Attorneys

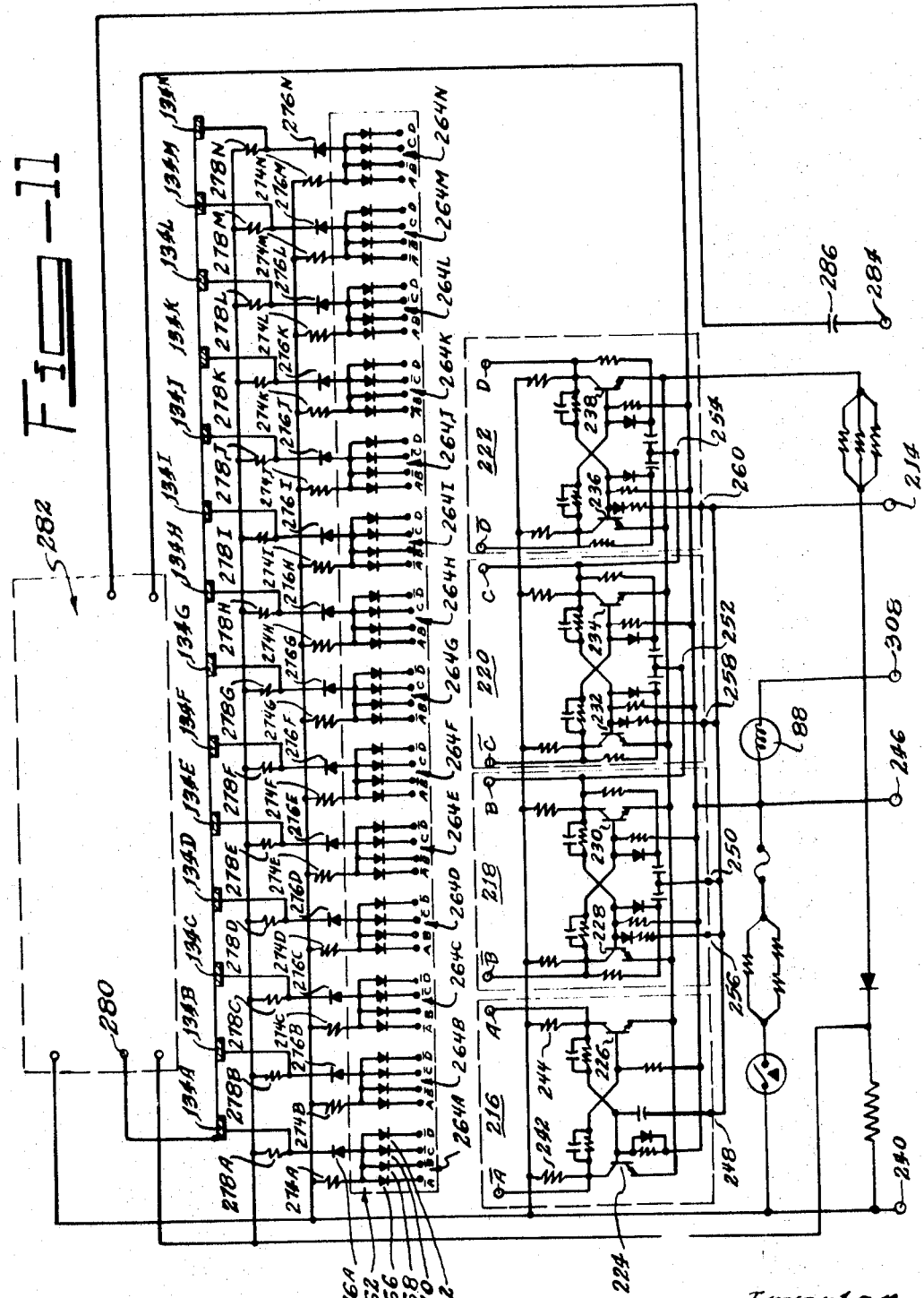

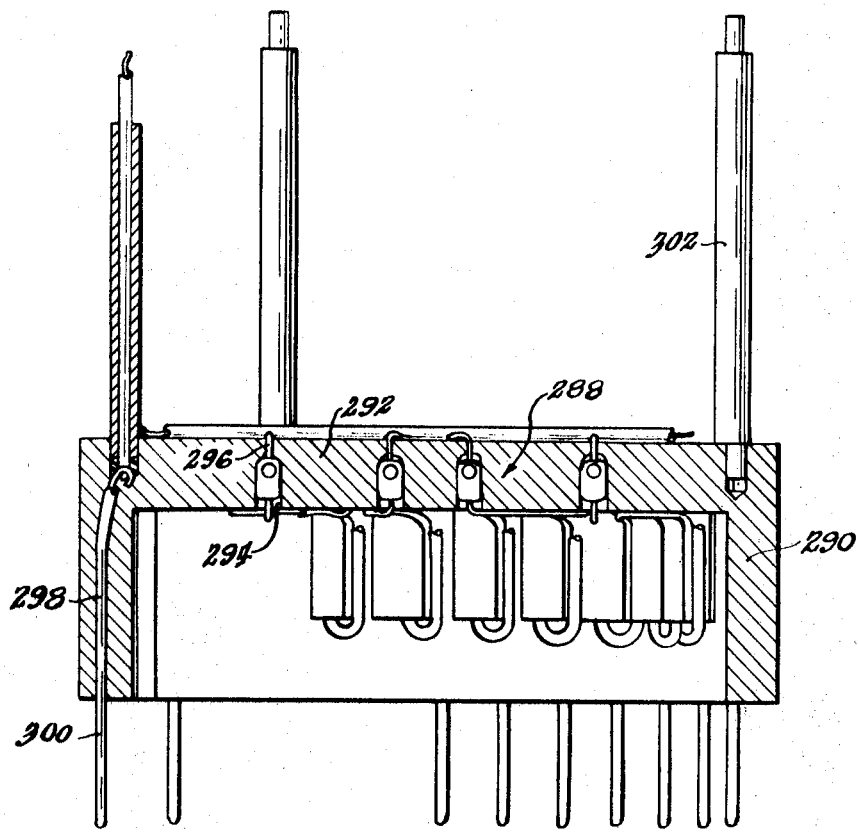

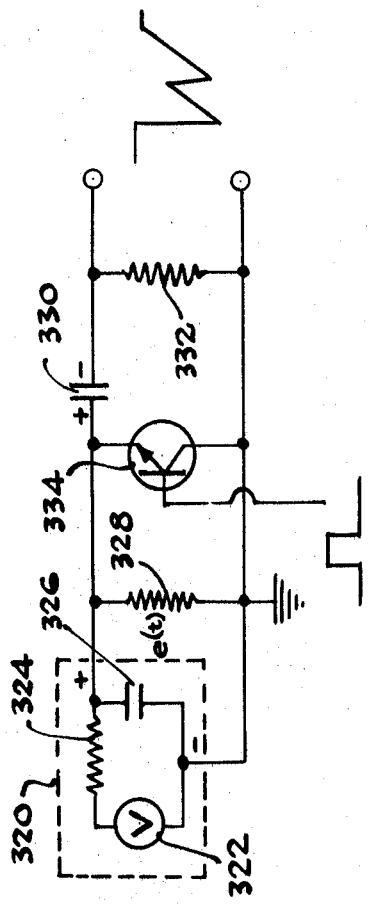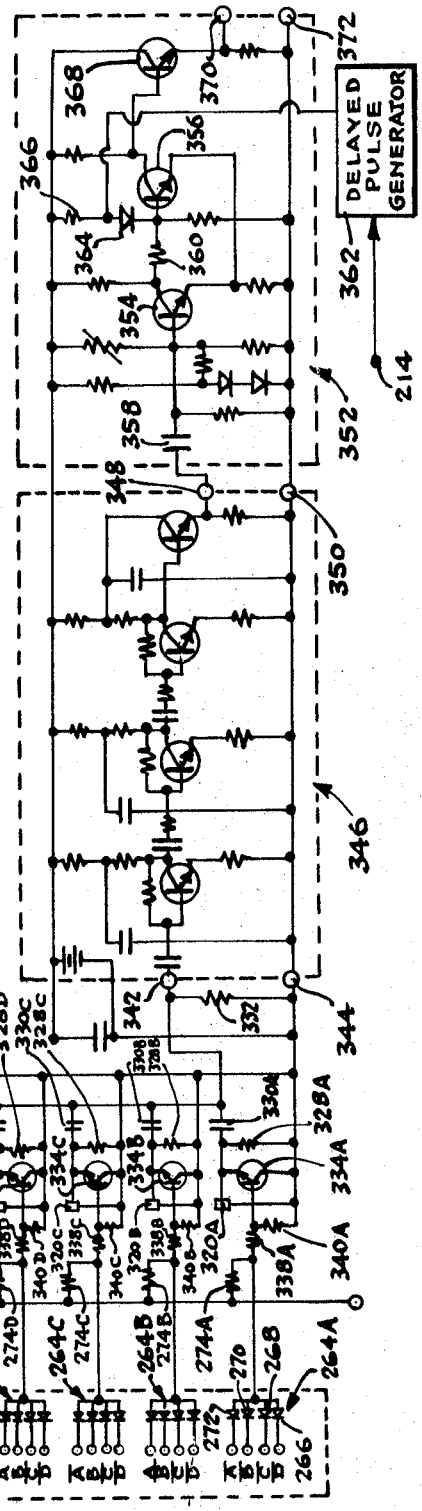

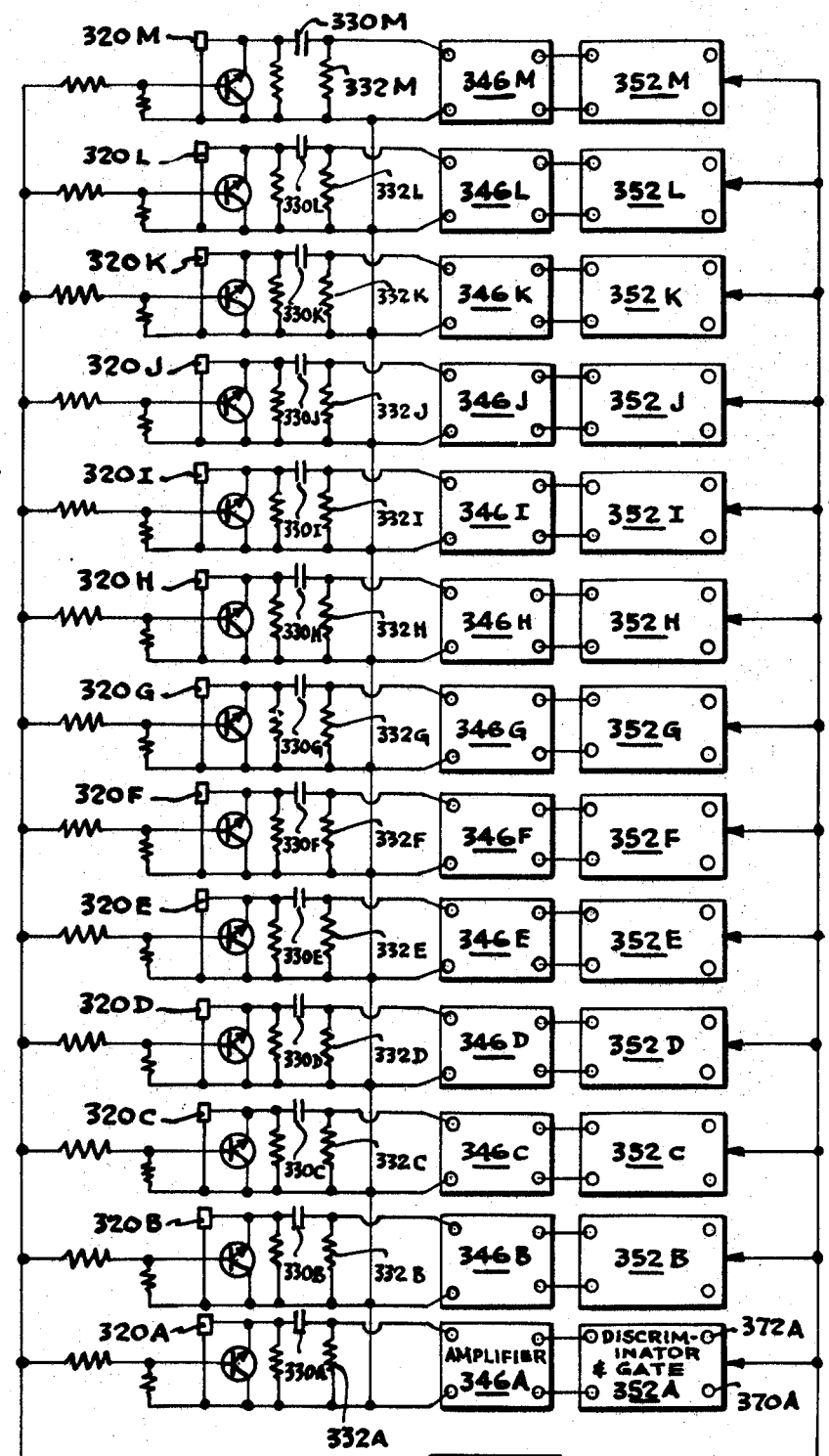

United States Patent Office 3,524,184
Patented Aug. 11, 1970

3,524,184
OPTICAL ENCODER
John Brean, Cincinnati, Ohio, assignor to D. H. Baldwin Company, Cincinnati, Ohio, a corporation of Ohio
Continuation-in-part of application Ser. No. 343,245, Feb. 7, 1964. This application Oct. 21, 1966, Ser. No. 589,192
Int. Cl. G08c 9/06
U.S. Cl. 340—347         15 Claims

ABSTRACT OF THE DISCLOSURE

A digital shaft angle encoder comprising a code disc having a plurality of concentric code tracks made up of alternate transparent and opaque segments, a continuous light source disposed on one side of the disc, a plurality of photo-voltaic cells disposed on the opposite side of the disc, one such cell confronting each track of the disc, and circuitry for periodically interrogating each of the photo-voltaic cells in sequence.

---

This application is a continuation-in-part of United States patent application Ser. No. 343,245 filed Feb. 7, 1964, now Pat. No. 3,281,830. The present invention relates generally to devices for digitally encoding the angular position of a shaft, and in particular to optical devices for encoding shaft angular positions.

Generally, an optical encoder employs a code member, usually in the form of a disc, mounted to rotate on a shaft, and the angular information to the encoder is impressed upon the rotatable shaft. The code disc is provided with one or more annular tracks of opaque and transparent sectors coaxially disposed about the center of the code disc. A lamp is disposed adjacent to one side of the code disc, and a photocell is mounted confronting each of the tracks on the opposite side of the code disc.

The position of the code disc is periodically determined by either flashing the lamp and noting the electrical response of the photocells, or by employing a constantly illuminated lamp and periodically generating an electrical pulse with a magnitude responsive to the presence or absence of illumination on each photocell. The presence or absence of illumination on each photocell may be determined simultaneously or in sequence, as more fully explained in Pat. No. 3,023,406 of Edward M. Jones entitled "Optical Encoder," dated Feb. 27, 1962.

The present invention is related to optical encoders which utilize a constant light source, rather than a flashing light source. Pat. No. 3,023,406 to Edward M. Jones discloses such an optical encoder utilizing photoresistive cells and a constantly illuminated lamp. It is an object of the present invention to provide such an encoder utilizing photovoltaic cells.

It is also an object of the present invention to provide an encoder employing a plurality of photocells which achieves a higher electrical output from the photocells than prior optical encoders and hence a more favorable signal to noise ratio.

It is also an object of the present invention to provide an optical encoder which incorporates the mechanical and electrical elements of the encoder in a common housing which is reduced in volume from that previously known to the art. Prior to the present invention, the diameter of shaft position encoders has been directly related to the resolution of the encoder, that is, the number of divisions of the encoder per revolution of the shaft. The volume of such encoders has been related to both the resolution of the encoder and the complexity of the electronics disposed within the encoder casing or housing. For example, the smallest prior 13 digit encoder provided with an electronics package within the housing to achieve an adequate output was approximately 2.6 inches in diameter and 3.0 inches in length. The optical encoder described in the following specification is an equivalent 13 digit encoder which has been constructed with an adequate electronics package in a housing having a diameter less than ⅔ of the diameter of the smallest known prior equivalent encoder and which has a volume of about 0.1 of the volume of the prior encoder. The encoder described in this specification is housed in a package of the dimensions of a size 11 synchro, namely, a diameter of 1.1 inch and a length of about 2 inches. The encoder achieves a resolution of 8,192 divisions (13 binary digits) and operates in a sequential mode that reads up to 1,000,000 digits per second.

It is an object of the present invention to provide a pulse generator synchronized to an input clock pulse which may be constructed in a compact form for purposes of interrogation of the photocells of an encoder.

These and further objects of the present invention will be more fully appreciated from a further consideration of this specification, particularly when viewed in the light of the drawings, in which:

FIG. 1 is an axial sectional view of an analog to digital encoder constructed according to the teachings of the present invention, some details having been omitted for clarity;

FIG. 2 is an elevational view of the photocell assembly and housing of the encoder illustrated in FIG. 1, the cover having been removed;

FIG. 3 is an end elevational view taken along the line 3—3 of FIG. 2 or the line 3—3 of FIG. 4, the end plate having been removed for clarity;

FIG. 4 is a fragmentary sectional view of the encoder taken along the line 4—4 of FIG. 3 or the line 4—4 of FIG. 2;

FIG. 5 is a sectional view of the lamp assembly for the encoder taken along the line 5—5 of FIG. 1;

FIG. 6 is a sectional view taken along the line 6—6 of FIG. 3;

FIG. 7 is a fragmentary sectional view taken along the line 7—7 of FIG. 6 or the line 7—7 of FIG. 2;

FIG. 8 is a plan view of the portion of the encoder illustrated in FIG. 2 taken along the line 8—8 of FIG. 2;

FIG. 9 is a fragmentary sectional view taken along the line 9—9 of FIG. 8;

FIG. 10 is a plan view taken along the line 10—10 of FIG. 6;

FIG. 11 is a schematic electrical circuit diagram of the optical encoder of FIGS. 1 through 10;

FIG. 12 is a curve showing the input interrogating pulse train for the encoder;

FIG. 13 is a sectional view of the diode matrix board assembly in greater detail than illustrated in FIG. 1;

FIG. 14 is a schematic electrical circuit diagram of an optical encoder which constitutes another embodiment of the present invention;

FIG. 15 is a simplified diagrammatic diagram of a portion of the circuit of FIG. 14; and FIG. 16 is a schematic diagram of another embodiment of an optical encoder constructed according to the present invention.

As illustrated in FIG. 1, the analog to digital encoder has a code disc 10 mounted on a housing 12 which also mounts a lamp and optical system 14. A photocell assembly 16 is mounted on the housing 12 on the side of the code disc 10 opposite the lamp and optical system 14, and an electrical interrogation means 18 is mounted on the remote side of a photocell assembly 16 from the code disc 10. The encoder is designed to operate from an interrogating pulse train which is received as an input and which will be more thoroughly described hereinafter, and an electronics package 20 is mounted on the interrogation means 18 for the purpose of controlling the interrogation means in response to the input interrogating pulse train and for the purpose of amplifying the signal from the photocell assembly 16 to a useable level. The entire assembly from the housing 12, including the lamp and optical system 14, the photocell assembly 16, the interrogation means 18, and the electronics package 20 are disposed within a cylindrical cover 22 which is mounted on the housing 12. It is to be noted that FIG. 1 illustrates the encoder in somewhat simplified form for purposes of clarity, and that certain details not shown in FIG. 1 are presented hereafter and described with reference to other figures.

FIGS. 2 through 4 illustrate the housing construction in greater detail than set forth in FIG. 1. The housing 12 has a cylindrical shell 24 and a wall 26 which extends across the shell normal to the axis thereof. The wall 26 is provided with a cylindrical sleeve 28 which extends coaxially within the shell 24 about the axis thereof and is aligned with and communicates with a circular opening 30 in the wall 26 located on the axis of the shell 24. The opening 30 and sleeve 28 form a cylindrical channel 32 which has a shoulder 34 adjacent to the opening 30. A first cylindrical ball bearing assembly 36 is disposed within the chanel 32 and mounted in abutment with the shoulder 34. A cylindrical spacer having an outer diameter approximately equal to the diameter of the channel 32 abuts the outer race 40 of the ball bearing assembly 36 and is secured in the bore 32 of the sleeve 28 to secure the ball bearing assembly 36 in position. A second ball bearing assembly 42 has an outer race 44 disposed within the sleeve 28 in abutment with the end of the spacer 38 opposite the ball bearing assembly 36, and a second spacer 46 cylindrical in form mounted on the interior surface of the channel 32 on the side of the outer race 44 opposite the spacer 38 secures the ball bearing assembly 42 firmly in position.

A shaft 48 extends through and is mounted on the inner race 50 of the ball bearing assembly 36 and the inner race 52 of the ball bearing assembly 42. The shaft 48 has a head 54 of greater diameter than other portions of the shaft 48, and the head 54 engages the confronting surface of the inner race 50 of the ball bearing assembly 36. The shaft 48 is slidable within the inner race 50 of the ball bearing assembly 36 and within the inner race 52 of the ball bearing assembly 42, but the shaft is secured on a spacer sleeve 56 which is coaxially disposed about the shaft 48 on the side of the ball bearing assembly 42 remote from the ball bearing assembly 36 by a ring 58 of cement. The sleeve 56 engages only the inner race 52 of the ball bearing assembly 42, and the head 54 engages only the inner race 50 of the ball bearing assembly 36. In assembling the ball bearing assemblies 36 and 42 on the shaft 48, a slight pressure forcing the inner races 50 and 52 toward each other is permanently established, for example two pounds per square inch. In this manner, the ball bearing assemblies 36 and 42 are preloaded to eliminate play in the bearings and to maintain rotation of the shaft 48 in precision alignment with the axis of the shell 24.

The shell 24 is provided with a plurality of inwardly extending protrusions 60, three in the particular construction here described, and the protrusions 60 are provided with threaded bores 62 which engage threaded screws 64 (FIG. 1) which mount a cover plate 66 on the shell 24. The cover plate 66 has a recess 68 (FIG. 1) extending from the interior surface thereof coaxially about the shaft 48 and a circular opening 70 extending about the shaft 48 to permit the shaft to rotatably extend to the exterior of the housing 12. A circular dust seal constructed of compliant material, such as plastic or rubber, designated 72, is disposed within the recess 68 and engages the confronting surface of the shaft 48 to seal the interior of the housing 12 from dust and dirt particles present in the ambient atmosphere.

The lamp and optical system 14 is also mounted within the shell (FIG. 1). FIGS. 2 and 4 illustrate the encoder with the lamp assembly removed, but FIG. 1 illustrates the lamp assembly, designated 74, in position, and FIG. 5 illustrates the details of the lamp assembly 74. The lamp assembly 74 has a curved plate 76. The plate 76 has a pair of parallel edges in the plane of FIG. 5, and is curved to fit in a groove 78 which is disposed in the exterior surface of the shell 24 adjacent to the wall 26 and extends about the entire perimeter of the shell 24. An inwardly protruding circular collar 80 extends from the central portion of the plate 76 and has a diameter approximately equal to the diameter of a circular aperture 82 in the shell 24 disposed centrally within the groove 78. The collar 80 has a pair of small apertures 84 and 86 which extend therethrough on opposite sides thereof in the plane of the circular groove 78, and a lamp 88 is mounted in the collar 80 by means of an epoxy cement layer 90. The two terminal wires 92 and 94 extend through the apertures 84 and 86, respectively, and are anchored at their ends opposite the lamp 88 on electrical contact plates 96 and 98 disposed on the interior side of the plate 76. Each of the contact plates 96 and 98 abuts an electrical terminal 100 protruding from the surface of the shell 24 within the groove 78 and adjacent to the aperture 82. The contact terminals are electrically connected to a source of direct current, not illustrated. The lamp 88 is an incandescent lamp and has a filament 102 disposed approximately on the axis of the cylindrical collar 80. The position of the lamp 88 is maintained by virtue of the close fit between the collar 80 and the aperture 82 in the shell 24 and by abutment of the edges of the plate 76 against the edges of the groove 78 in the shell 24. In addition, the plate 76 is maintained in abutment with the surface of the groove 78 by the cover 22 which extends over the groove 78 as illustrated in FIG. 1.

Light from the lamp 88 is focused on the code disc 16 by two mirrors or prisms designated 104 and 106. FIGS. 3 and 6 best illustrate the optical system of the encoder. The prism 104 is illustrated in FIG. 6 as mounted on the lower surface of the wall 26, as by cement. It will be noted from FIG. 3 that the prism 104 has a curved exterior convex surface 108 parallel to the axis of the shaft 48 and that this surface is remote from a flat surface 110 parallel to the axis of the shaft 48 and also parallel to the axis of the filament 102 of the lamp 88. The flat surface 110 immediately confronts the lamp 88, and the convex surface 108 is on the opposite side of the flat surface 110 from the lamp 88 so that light rays entering the prism 104 will enter through the flat surface 110 and be reflected from the interface of the more dense material of the prism and the less dense atmosphere exterior of the prism when the rays reach the curved surface 108 at an angle in excess of the critical angle for the material of the prism 104. FIG. 3 illustrates the path of the two rays 112a and 112b which extend from opposite ends of the filament 102 perpendicular to the axis of the filament and illustrates that these rays are reflected from the convex surface 108 parallel to each other and parallel to the flat surface 110. In like manner, those rays from the filament 102 which impinge upon the ends of the convex surface 108, designated 114a and 114b, also are reflected by the convex surface 108 to a direction parallel with the flat surface 110.

As illustrated in FIG. 6, the prism 104 has a second convex surface 116 at the end opposite the convex surface 108 which is convex about an axis normal to the flat surface 110 and normal to the axis of curvature of the convex surface 108. Rays traveling parallel to the flat upper surface, designated 119 in FIG. 6, are reflected from the convex surface 116 to pass through a slot 120 in the wall 26 to impinge upon the code disc 10. All light rays traveling parallel to the surface 118 of the prism 104 are reflected by the convex surface 116 to focus on a point disposed in the plane of the upper surface of the code disc 10. For illustrative purposes, it is assumed that the ray 114b illustrated in FIG. 3 enters the flat surface 110 of the prism 104 adjacent to the surface remote from the flat surface 118 and is reflected from a point on the convex surface 116 adjacent to the flat surface remote from the surface 118 to focus on a point of a line designated 122 in the plane of the upper surface of the code disc 10. Also, the ray 114a is illustrated as entering the prism 104 adjacent to the flat surface 118 and being reflected by the convex surface 116 to focus on the same point of the line 122.

The prism 106 is a mirror image of the prism 104, and hence two lines of light pass through the slots 120 located on opposite sides of the shaft 48 and are disposed in a line with the axis of the shaft 48. The two lines of light are represented by the focal line 122 in FIG. 6 and are disposed in the plane of the upper surface of the code disc 10.

The code disc 10 has a circular flat glass plate 124 which is provided with a coating 126 on its surface remote from the wall 26, and this coating 126 is provided with a plurality of tracks, one of which is illustrated in FIG. 6 and designated 128, which consists of alternating opaque sectors 130 and transparent sectors 132. The tracks 128 are coaxial about the shaft 48.

The focal lines 122 are disposed on a diameter of the code disc 10, and the photocell assembly 16 positioned adjacent to the code disc 10 has two rows of photocells 134 confronting the code disc 10 and aligned with the two focal axes 122. FIG. 6 illustrates one of the photocells 134 confronting the track 126, and an identical photocell confronts each of the other tracks of the code disc. In the particular construction described throughout this specification, the encoder disc 10 has fourteen tracks and fourteen photocells, thirteen of the tracks having alternate transparent and opaque sectors as illustrated, and the fourteenth track being nearest to the axis of the shaft 48 and being entirely transparent. The innermost transparent track is for the purpose of providing a reference signal indicating the brilliance of the light source in accordance with the teachings of Pat. No. 3,023,406 of Edward M. Jones, issued Feb. 27, 1962.

Each of the photocells 134 has a pair of electrically conducting electrodes 136 and 138 mounted on a base plate 140 of electrically insulating material. A mass 142 of semi-conductive material is disposed between the electrodes 136 and 138, and a transparent cover plate 144 which is circular in form is sealed about its metal perimeter 144a by a layer of solder 146. Three circular wafers 148 space the cover plate 144 from the electrodes 136 and 138. Both the cover plate 144 and the base 140 are constructed of glass, the base because of the electrically insulating properties of glass and the cover plate because of its transparency.

As best illustrated in FIG. 7, one of the electrodes 138 of each of the cells located on one side of the axis 48 of the encoder, designated 134A, 134B, 134C, 134D, 134E, 134F, and 134G, is in the form of a common strip of electrically conducting film disposed upon the base 140. In like manner, the photocells disposed upon the opposite side of the shaft 48, designated 134H, 134I, 134J, 134K, 134L, 134M, and 134N, have a common electrically conducting film in the form of a strip for the electrode 138. The two strips 138 of electrically conducting material are electrically connected to a pin 150A disposed adjacent to the perimeter of the base plate 140 by an electrically conducting film 152 disposed on the base plate 140 and partially over the two electrically conducting strips 138. The other electrode 136 of each of the photocells is connected to an individual terminal pin located adjacent to the perimeter of the base plate 140, the cell 134A being connected to terminal pin 154A, cell 134B being connected to terminal pin 154B, and cells 134C, 134D, 134E, 134F, 134G, 134H, 134I, 134J, 134K, 134L, 134M, and 134N, having their other electrode 136 connected to terminal pins 154C, 154D, 154E, 154F, 154G, 154H, 154I, 154J, 154K, 154L, 154M, and 154N, respectively. The base plate 140 has a recess 156 on its side opposite the photocells, and the pins extend through the circular flange 158 formed by the recess and protrude therefrom to permit electrical connection to the electrodes 136 and 138 of the photocells.

The base plate 140 has a metal perimeter 140a and three equally spaced tabs 160 extend outwardly from the perimeter 140a of the base plate 140 for mounting the base plate and photocell assembly on the housing 12. The housing 12 has three forks 162 which extend upwardly from the shell 24 and are equally spaced about the perimeter of the wall 26. The forks 162 are normal to the wall 26 and are provided with rectangular indentations 164 forming a pair of parallel legs 166. The photocell assembly 16 is positioned with the tabs 160 thereof disposed within the indentations 164 of the forks 162. The distance between the legs 166 of each fork exceeds the width of the tabs 160, thereby permitting the photocell assembly to be displaced rotationally a short distance to permit alignment of the photocell assembly with the focal axis 122 of the optical system. When alignment has been achieved, the photocell assembly is cemented in place on the forks 162 of the housing 12.

As best illustrated in FIGS. 2, 8, and 9, arcuate connectors 168A, 168B, and 168C are disposed between the forks 162 and form with the forks 162 a cylindrical surface. The arcuate connectors 168A, 168B, and 168C have a body 170 of electrically insulating material, and a plurality of electrically conducting sockets 172 are spaced along the perimeter of each of the arcuate connectors 168. The arcuate connector 168A has sockets 172A, 172B, 172C, 172D, 172E, 172F, 172G, and 172H and a cylindrical channel is disposed between the adjacent sockets and designated 174A, 174B, 174C, 174D, 174E, 174F, and 174G. Photocell terminal pin 154A is connected to an electrically conducting wire 176A having an electrically insulating coating which extends through the channel 174A and through a bore 178A in the outwardly extending flange 180 formed in the shell 24 of the housing 12 adjacent the wall 26 to enter an aperture 182A which extends through the shell 24 for purposes which will be described hereinafter. In like manner, photocell pin 154B has a wire 176B which passes through the channel 174B in the flange 180 to enter an aperture 182B. In like manner, photocell terminal pins 154C, 154D, 154E, 154F, and 154G, are electrically connected to wires 176C, 176D, 176E, 176F, and 176G which pass through channels 174C, 174D, 174E, 174F, and 174G, respectively, in the arcuate connector 168A and also through channels 178C, 178D, 178E, 178F, and 178G, in the flange 180. These wires in turn pass through apertures 182C, 182D, 182E, 182F, and 182G, respectively, in the shell 24.

In like manner, the socket 172A has a wire 184A which extends through a channel 186A in the flange 180 aligned with the socket 172, and the wire 184A passes through a bore 188A in the shell 24. Likewise, the socket 172B, 172C, 172D, 172E, 172F, 172G, and 172H have wires which pass through channels 186B, 186C, 186D, 186E, 186F, 186G, and 186H in the flange 180 and enter through bores 188B, 188C, 188D, 188E, 188F, 188G, and 188H in the shell 24. The bores 182 and 188 are disposed in a common line, and the channels 186 and 178 are disposed in a common arcuate plane.

The arcuate connector 168B is identical to the arcuate connector 168A and will not be further described. The arcuate connector 168C is also constructed of electrically insulating material and has sockets 190A, 190B, 190C, 190D, and 190E extending therethrough. The socket 190A is connected to a wire 192 which is connected to one of the spring contacts 100 for the lamp assembly. The socket 190E is connected to a wire 194 which is connected to the other spring contact 100 of the lamp assembly, and the socket 190E is also interconnected with the socket 190D and forms a common or ground terminal for the encoder. The pin 150A of the photocell assembly is electrically connected to the socket 190C of the arcuate connector 168C, and, as will be explained hereinafter, is electrically connected to the electronics package 20.

A heater and thermostat assembly 196 is disposed in the recess 156 of the photocell assembly and has terminals 198 and 200. Also, as illustrated in FIG. 10, a pair of heaters 202 and 204 are disposed on the surface of the cover glass 144 of the photocell assembly 16 on opposite sides of the photocells 134. The two heaters 202 and 204 are connected in series and in parallel with the heater 196A. The purpose of the heaters 196A, 202, and 204 is to maintain the photoresistive cells 134 at a temperature within a narrow range.

The photocells 134 are constructed with masses 142 of photoconductive material and may be constructed in the manner described in the patent application of William B. Hugle et al., Ser. No. 791,400, filed Feb. 5, 1959, entitled "Photocells and Method of Manufacturing Photocells," now Pat. No. 3,187,414. The photoconductive mass 142 may comprise cadmium sulfide, lead sulfide, lead selenide, zinc selenide, zinc sulfide, zinc telluride, cadmium telluride, germanium, silicon, and lead telluride, and in the particular embodiment of this invention described throughout this specification cadmium selenide is utilized for the photoconductive mass. The electrodes 136 and 138 for the photocells 134 may comprise gold, silver, chromium, or Inconel, for example.

FIG. 10 also illustrates a first mask block 206 positioned over photocells 134A, 134B, 134C, 134D, 134E, 134F, and 134G, carrying a semi-cylindrical lens 210 cemented on the surface of the mask block 206 in alignment with the focal axis 122 (FIG. 6) of the optical system confronting these photoconductive cells. In like manner, a second semi-cylindrical lens 212 has its flat surface cemented on the flat surface of a second mask block 208 in alignment with the focal axis 122 confronting the cells 134H, 134I, 134J, 134K, 134L, 134M, and 134N (FIG. 7). In this manner, the image of the code disc 10 is focused on the sensitive areas of the photocells in accordance with the teachings of Pat. No. 2,941,088 of W. H. Mahaney, entitled "Optical Encoder."

FIG. 11 is a schematic circuit diagram illustrating the electrical circuits of the optical encoder described herein which are designed to respond to an input pulse train in the form illustrated in FIG. 12. The input pulse train is impressed upon an input terminal 214, which is electrically connected to the input circuit of four flip-flops designated 216, 218, 220, and 222. The flip-flop 216 has two transistors 224 and 226 connected in a conventional transistor flip-flop circuit with output terminal designated $\overline{A}$ and A. In like manner, flip-flop 218 utilizes transistors 228 and 230 and has output terminals designated $\overline{B}$ and B. Also, flip-flop 220 has transistors 232 and 234 driving output terminals $\overline{C}$ and C. Also, flip-flop 222 utilizes transistors 236 and 238 to drive output terminals $\overline{D}$ and D. In each case, the collector of one of the transistors is connected to the output terminal and also to a positive source of potential through a voltage dropping resistor. For example, in flip-flop 216, the collector of transistor 224 is connected to the output terminal $\overline{A}$ and connected to a source of positive potential applied through a terminal 240 through a resistor 242. The transistor 226 has a collector connected to the output terminal A and to the terminal 240 through a resistor 244.

The input terminal of flip-flop 216 has been designated 248, the input terminal of flip-flop 218 has been designated 250, the input terminal of flip-flop 220 has been designated 252, and the input terminal of flip-flop 222 has been designated 254. The input terminals 248 and 250 of the flip-flops 216 and 218 are connected to the input terminal 214 and receive the pulse train illustrated in FIG. 12. The input terminal 252 of flip-flop 220 is connected to the output terminal B of flip-flop 218, and the input terminal 254 of flip-flop 222 is connected to the output terminal C of flip-flop 220. Flip-flops 218, 220, and 222 have reset input terminals 256, 258, and 260, respectively, which are connected to the input terminal 214 and reset these flip-flops in response to the negative leading portion of the wave train of FIG. 12. The flip-flop 216 is also reset to the same condition by the negative going initial pulse of the wave train, said reset or zero position causing transistors 224, 228, 232, and 236 to be cut off.

Flip-flops 216, 218, 220, and 222 form a four stage flip-flop counter. The positive going successive pulses of the input wave train illustrated in FIG. 12 result in successive unique combinations of outputs on the output terminals $\overline{A}$, A, $\overline{B}$, B, $\overline{C}$, C, $\overline{D}$, D.

FIG. 11 illustrates a switching matrix 262. The switching matrix 262 has fourteen sections designated 264A, 264B, 264C, 264D, 264E, 264F, 264G, 264H, 264I, 264J, 264K, 264L, 264M, and 264N. Each of these sections has four diodes designated 266, 268, 270, and 272, and these diodes have one terminal electrically interconnected and the other terminal connected to one of the outputs of one of the four flip-flops 216, 218, 220, and 222.

In the section 264A, the diode 266 has one of its terminals connected to the output terminal $\overline{A}$, the diode 268 has one of its terminals connected to the output $\overline{B}$, the diode 270 has one of its terminals connected to the output $\overline{C}$, and the diode 272 has one of its terminals connected to the output $\overline{D}$. In like manner, the diodes of the groups 264B, 264C, 264D, 264E, 264F, 264G, 264H, 264I, 264J, 264K, 264L, 264M, and 264N have their output terminals connected to the output terminals of the flip-flops 216, 218, 220, and 222 indicated on the drawing of FIG. 11. The diodes are all biased to pass positive charges in the direction of the flip-flops, and the common connected terminals of the diodes are connected to the positive power source terminal 240 through a resistor designated 274A, 274B, 274C, 274D, 274E, 274F, 274G, 274H, 274I, 274J, 274K, 274L, 274M, or 274N. The interconnected diodes of each group are also electrically connected to one of the photocells of the photocell assembly through a diode biased to pass positive charges in the direction of the photocell, that is, group 264A is connected to photocell 134A in series with diode 276A, group 264B is connected to photocell 134B through diode 276B, and groups 264C, 264D, 264E, 264F, 264G, 264H, 264I, 264J, 264K, 264L, 264M, and 264N of diodes are connected to their respective photocells through diodes 276C, 276D, 276E, 276F, 276G, 276H, 276I, 276J, 276K, 276L, 276M, and 276N, respectively. In addition, each of the photocells is connected to a positive potential lower than that of terminal 240 through a balancing resistor, the separate balancing resistors being designated 278A, 278B, 278C, 278D, 278E, 278F, 278G, 278H, 278I, 278J, 278K, 278L, 278M, and 278N. These resistors are selected to produce the same photocell current under the same conditions of illumination in spite of differences in photocell characteristics. The common electrode of each of the photocells is connected to the input terminal 280 of an amplifier 282, and the output of the amplifier 282 is connected to the output terminal 284 through a capacitor 286.

Since there are thirteen combinations of outputs occurring in sequence at the repetition rate of the flip-flop counter, it is only necessary for the diode groups acting as a coincidence counter to select the right combination for sampling a particular photocell. As long as one of the diodes 266, 268, 270 or 272 in a particular group is connected to a low impedance output of a flip-flop, the positive potential on the photocell associated with that group is determined by the resistor 278 associated with that photocell. However, when all diodes of the group are connected to flip-flop outputs having positive potentials, the flow of current through all diodes of the group is prevented, and a positive pulse is delivered to the associated photocell through the resistor 274 and the diode 276 associated with the photocell.

The balancing resistors are located about the bearing structure in the shell 24 of the housing 12. FIG. 1 illustrates one of the balancing resistors 278G mounted on a resistance mounting board 310 and electrically connected by means of the wire 176G to the photocell 134G. The opposite end of the resistor is connected to socket 172H, and the matrix 262 is plugged into the socket 172H, along with other sockets, to make electrical connection, as more clearly illustrated in FIGS. 1, 9, and 13.

FIG. 13 illustrates the diode matrix 262 in its physical form which utilizes a cup 288 of electrically insulating material having a cylindrical outer wall 290 of the same diameter as the diameter of the shell 24 of the housing 12. The cup 288 has a flat base 292 which is provided with recesses 294 extending therein from the surface confined within the cylindrical wall 290, and each of the recesses 294 contains one of the diodes of the diode sections 264A through 264N. Each recess 294 is provided with a bore 296 which extends to the opposite side of the base 292 from the recess 294 and one of the pigtail terminals of each of the diodes extends through this bore 296 to be electrically connected in the circuit of the diode matrix 262 by printed circuit techniques. In all, there are seventy recesses 294 to contain the seventy diodes of the matrix 262, including diodes 276A through 276N. Further, the resistors 274A through 274N are mounted on the base 292 within the cylindrical wall 290 of the cup 288 and connected in the matrix circuit as shown in FIG. 11.

The cylindrical wall 290 of the cup 288 is provided with a plurality of channels 298, and outwardly extending pins 300 are anchored in the channels 298. These pins 300 are aligned with the sockets 172 of the arcuate connectors 168A, 168B, and 168C (FIG. 8). In this manner, electrical connection is achieved from the sockets to the electronics package 20. More specifically, the photocells 134 of the photocell assembly are connected by means of these pins 300 engaging the sockets 172 to the coupling diodes 276 of the diode matrix 262.

FIG. 1 and FIG. 13 illustrate a plurality of posts 302 which extend from the base 292 of the cup 288 away from the arcuate connectors 168A, 168B, and 168C. The posts 302 are utilized to mount four printed circuit boards, designated 304A, 304B, 304C, and 304D which contain the flip-flop circuits 216 and 218, the flip-flop circuits 220 and 222, the amplifier 282, and power resistors, respectively. Since these elements are otherwise conventional, they will not be further described. The terminals 240, 246, 214, and 284 are in the form of pins or lugs 306 which protrude from the end of cover 22. A separate terminal 308 is provided to provide electrical energy for the lamp 88, as indicated in FIG. 11.

The matrix switching circuit 262 impresses a positive potential of approximately 13 volts on the junction between the first diode 276 and the group of diodes 266, 268, 270 and 272 through the resistor 274. However, this potential is available for actuation of the photocell associated with the group of diodes only during periods when the output terminals from the associated flip-flops 216, 218, and 222 are at high impedance relative to the return terminal 246. The output terminals of the flip-flops are connected so that only one photocell is subjected to this potential at a given time, thereby interrogating that photocell. In order to make certain that the photocell will not be interrogated at other times, the common electrode of the photocell is maintained at a potential of approximately 4.5 volts applied through the input of the amplifier 282, and the balancing resistors 278 also have their common terminal connected to this potential.

FIG. 14 illustrates the electrical circuit diagram for an encoder of the type shown in FIGS. 1 through 10 and 13 for use with photo-voltaic cells. The input pulse train illustrated in FIG. 12 is also utilized and the flip-flop circuits designated 216, 218, 220 and 222 are utilized, as will be more fully described hereinafter.

FIG. 15 diagrammatically illustrates the manner in which a photo-voltaic cell may be sampled by means of a square wave pulse, and this circuit is utilized in the encoder of FIG. 14. In FIG. 15, the photo-voltaic cell is indicated at 320, and this cell will generate a voltage in response to illumination in the form of a direct current potential, and the voltage generator symbol 322 is utilized to indicate this property of the photocell 320. In addition, the photocell 320 has an internal resistance 324, and an internal capacitance 326. A load resistor 328 is connected to the output of the photocell 320, and hence in parallel with the internal capacitance 326 of the photo-voltaic cell 320. An external capacitor 330 is connected to one terminal of the load resistor 328, and the other terminal of the capacitor 330 is connected to one terminal of an output resistor 332. The other terminal of the output resistor 332 is connected to the other terminal of the load resistor 328. A switch in the form of a transistor 334 is connected in parallel with the load resistor 328. In the particular circuit illustrated, the transistor 334 has an emitter connected to the junction of the load resistor 328 and the capacitor 330 and a collector connected to the junction of the load resistor 328 and the output resistor 332.

When the photocell 320 is illuminated, assuming the switch formed by the transistor 334 is open, a voltage will be generated across the load resistor 328, and this voltage will charge the capacitor 330 through the output resistor 332. Assuming that the output of the photo-voltaic cell 320 is as indicated, the capacitor will be charged as indicated, that is, the capacitor will be charged to place the output terminal of the photo-voltaic cell positively relative to the indicated ground. When the switch represented by the transistor 334 is closed, which may be achieved by driving the base of the transistor 334 with a pulse as indicated to saturate the transistor, the capacitor 330 will discharge through the output resistor 332, thus generating a negative pulse as indicated in the output of the photo-voltaic cell circuit. However, the transistor 334 has a capacity between its collector and emitter, even though the transistor 334 is selected for low capacitance, and the discharge of this capacity through capacitor 330 and the output resistor 332 results in a second negative peak being generated with a delay relative to the first negative peak, and indicated in the output pulse.

If the photo-voltaic cell 320 is maintained in darkness, the voltage $e(T)$ across the load resistor 328 will have a zero value, and the capacitor 330 will not be charged. Hence, shorting of the capacitor 330 across the output resistor 332 will not result in a negative signal pulse, but the pulse due to the transistor capacitance will be present.

After the trailing edge occurs of the saturating pulse applied to the transistor 334, the transistor switch is opened, and the capacitor 330 may again be charged in response to the electrical output of the photo-voltaic cell 320 which depends upon the illumination of the photo-voltaic cell 320. There must be adequate time to recharge the capacitor 330 in the event the photo-voltaic cell 320 is illuminated before the next sampling pulse is applied to the base of the transistor 334. By selecting photo-voltaic cells 320 of low capacitance and transistor 334 of low capacitance, sampling rates of the order of 500 kilocycles per second can be achieved.

When photo-voltaic cells are employed in the encoder of FIGS. 1 through 10 and 13, thirteen cells are utilized, one confronting each of the tracks of the code disc. For this reason, FIG. 14 illustrates thirteen photo-voltaic cells designated 320A, 320B, 320C, 320D, 320E, 320F, 320G, 320H, 320I, 320J, 320K, 320L, and 320M. The photo-voltaic cells have a common output resistor 332 which is directly connected to one terminal of each of the photo-voltaic cells.

The other terminal of photo-voltaic cell 320A is connected to the other terminal of the common load resistor 332 through a capacitor 330A. Also, a photo-voltaic cell load resistor 328A is connected across the photo-voltaic cell 320A. A transistor switch employing transistor 334A is also connected across the output of the photo-voltaic cell 320A, the transistor 334A having an emitter connected to the junction of the photo-voltaic cell 320A and the capacitor 330A, and a collector connected to the junction of the photocell load resistor 328A and the photo-voltaic cell.

In like manner, each of the photo-voltaic cells 320B, 320C, 320D, 320E, 320F, 320G, 320H, 320I, 320J, 320K, 320L and 320M has one terminal connected to one side of the common load resistor 332 through a capacitor and a common bus 336, the capacitors being designated respectively 330B, 330C, 330D, 330E, 330F, 330G, 330H, 330I, 33J, 330K, 330L and 330M. Also in like manner, a photocell load resistor is connected across each of the other photo-voltaic cells and respectively designated 328B, 328C, 328D, 328E, 328F, 328G, 328H, 328I, 328J, 328K, 328L and 328M. Further, a transistor switch is connected across each of the other photo-voltaic cells in the same manner as indicated for the photo-voltaic cell 320A, these transistor switches employing transistors designated respectively 334B, 334C, 334D, 334E, 334F, 334G, 334H, 334I, 334J, 334K, 334L and 334M. Each of these transistors has an emitter connected to one terminal of its respective photocell and a collector connected to the other terminal of its respective photocell.

The photo-voltaic cells of the encoder of FIG. 14 are interrogated sequentially by applying a square wave pulse to each of the bases of the transistor switches associated with the photocells in sequence. These square wave pulses are generated from the input pulse train illustrated in FIG. 12. As illustrated in FIG. 11, the input pulse train is impressed upon the input terminal 214, and hence is impressed upon the four flip-flops designated 216, 218, 220, and 222. As previously explained, the flip-flop 216 produces output potentials on its terminals designated $\bar{A}$ and A, the flip-flop 218 generates output potentials on its terminals designated $\bar{B}$ and B, the flip-flop 220 generates output potentials on its terminals designated $\bar{C}$ and C, and the flip-flop 222 generates output potentials on its terminals designated $\bar{D}$ and D. As previously explained, the flip-flops 216, 218, 220 and 222 constitute a four stage counter and produce successive unique combinations of outputs on the output terminals $\bar{A}$, A, $\bar{B}$, B, $\bar{C}$, C, $\bar{D}$, D, and these unique combinations of outputs are utilized in the optical encoder of FIG. 14.

The matrix 262 is also utilized in the encoder of FIG. 14, and the matrix is connected to the output terminals $\bar{A}$, A, $\bar{B}$, B, $\bar{C}$, C, $\bar{D}$, D of the flip-flops 216, 218, 220 and 222 in the same manner as illustrated in FIG. 11. For this reason, the same reference numerals have been applied to the matrix illustrated in FIG. 14. The interconnected terminal of the diodes 266, 268, 270, and 272 of each of the groups of diodes 264A, 264B, 264C, 264D, 264E, 264F, 264G, 264H, 264I, 264J, 264K, 264L, and 264M are respectively connected to the positive terminal of a power source through the resistors 274A, 274B, 274C, 274D, 274E, 274F, 274G, 274H, 274I, 274J, 274K, 274L and 274M, as in FIG. 11. However, it is to be noted that the interconnected terminals of the diodes in group 264A are connected to the base of the transistor 334A through a resistor 338A. In like manner, each of the other groups of diodes designated 264B, 264C, 264D, 264E, 264F, 264G, 264H, 264I, 264J, 264K, 264L and 264M is connected to the base of its respective transistor through resistors 338B, 338C, 338D, 338E, 338F, 338G, 338H, 338I, 338J, 338K, 338L and 338M. In addition, a resistor 340A is connected between the base and collector of transistor 334A, and corresponding resistors 340B, 340C, 340D, 340E, 340F, 340G, 340H, 340I, 340J, 340K, 340L and 340M are connected between the base and collector of transistors 334B, 334C, 334D, 334E, 334F, 334G, 334H, 334I, 334J, 334K, 334L and 334M, respectively.

Considering the photocell circuit 320A, as long as one of the outputs $\bar{A}$, $\bar{B}$, $\bar{C}$, $\bar{D}$ of the flip-flops 216, 218, 220 and 222 is at a low impedance, an insufficient positive potential will exist on the base of transistor 334A to permit conduction between the collector and emitter of transistor 334A. The resistor 340A aids in establishing a small positive potential on the base of transistor 334A under these circumstances. Assuming that the photo-voltaic cell 320A is illuminated, under these circumstances the capacitor 330A will be charged to the potential generated across photocell output resistor 328A. When a positive potential appears on all four output terminals $\bar{A}$, $\bar{B}$, $\bar{C}$, $\bar{D}$, then the potential of the base of transistor 334A will be driven positive as a result of the flow of current through resistors 274A and 338A, thus saturating the transistor 334A and shorting capacitor 330A across the output resistor 332.

In like manner, a positive potential will appear on the base of transistor 334B only when a positive output appears on terminals A, $\bar{B}$, C, $\bar{D}$. In like manner, each of the other transistors 334C, 334D, 334E, 334F, 334G, 334H, 334I, 334J, 334K, 334L and 334M will receive a positive pulse on their respective bases in sequence, thereby shorting their respective capacitors 330B, 330C, 330D, 330E, 330F, 330G, 330H, 330I, 330J, 330K, 330L and 330M across the output resistor 332. If all of the photo-voltaic cells 320 of the encoder are illuminated, the output resistor 332 will thus receive a chain of thirteen negative going pulses in sequence following each reset pulse of the train of FIG. 12.

The output resistor 332 is connected to the input terminals 342 and 344 of a multistage transistor amplifier 346 capable of conducting and amplifying the pulses produced on the output resistor 332 at the repetition rate of the four-stage flip-flop counter. The amplified pulses appear sequentially across the output terminals 348 and 350 of the amplifier 346 in amplified form.

The output of the amplifier 346 is impressed upon the input of a discriminator 352 which further shapes and standardizes the pulses produced at the output of the amplifier 346. As illustrated, the discriminator is an emitter-coupled circuit employing transistors 354 and 356. The base of transistor 354 is coupled to the output terminal of the amplifier 346 through a capacitor 358, and this base is also provided with a stable positive bias. Positive feedback is provided in the discriminator 352 by interconnecting the emitters of the transistors 354 and 356 and by connecting the base of transistor 356 to the collector of transistor 354 through a resistor 360. The input signal saturates the discriminator 352, and the output appearing on the collector of transistor 356 is in the form of standardized pulses of substantially greater amplitude than appear on the output terminals 348 and 350 of the amplifier 346.

As explained in connection with FIG. 15, a pulse resulting from sampling of an illuminated photo-voltaic cell 320 is in the form of a negative pulse and has a delayed secondary negative pulse, this pulse appearing across the load resistor 332. The same wave form appears in the output of the amplifier 346. In order to prevent the delayed secondary negative portion of the pulse resulting from a single sampling pulse from causing two output pulses from the discriminator, a gate is provided in the discriminator circuit to prevent conduction of signals during the period of time of the secondary negative pulse. For this reason, a pulse delay circuit 362 is coupled to the input pulse train at the terminal 214 to produce a pulse which is synchronized in time with the secondary negative pulse which appears for each sampling pulse across the load resistor 332. The output of the delayed pulse generator is connected to the base of transistor 356 through a diode 364. The diode 364 is coupled to the positive terminal of the power supply through a resistor 366 and is connected to pass positive charges to the base of the transistor 356. The base of the transistor 356 is positively biased and operates in its normal manner in the absence of a pulse from the delayed pulse generator 362. Positive pulses from the delayed pulse generator 362 saturate the transistor 356 and prevent the secondary pulse generated by sampling of the photo-voltaic cells from passing to the output of the discriminator 352. An emitter follower 368 is coupled to the collector of the transistor 356, and the output of the emitter follower appears across output terminals 370 and 372.

The output appearing on the terminals 370 and 372 may be directly used in sequential form and represents the cyclic binary code. This output may be converted to straight binary code, and also changed to a parallel output, if desired.

FIG. 16 is a schematic diagram which illustrates an optical encoder in which sampling of photo-voltaic cells results directly in a parallel output. In FIG. 16, the same reference numerals will be used to identify identical parts as set forth in FIG. 14. The photo-voltaic cells 320A, 320B, 320C, 320D, 320E, 320F, 320G, 320H, 320I, 320J, 320K, 320L, and 320M are connected in identical circuits with that shown in FIG. 14, except each circuit is provided with a separate load resistor, the load resistors being designated 332A, 332B, 332C, 332D, 332E, 332F, 332G, 332H, 332I, 332J, 332K, 332L, and 332M. These load resistors are connected to the side of the capacitors 330A, 330B, 330C, 330D, 330E, 330F, 330G, 330H, 330I, 330J, 330K, 330L and 330M, respectively, remote from the associated photocell and the ground or common terminal.

A separate amplifier is connected across each of the load resistors, these amplifiers being designated 346A, 346B, 346C, 346D, 346E, 346F, 346G, 346H, 346I, 346J, 346K, 346L and 346M, respectively. The output of each of the amplifiers is connected to the input of a discriminator and gate circuit, these gate circuits being designated 352A, 352B, 352C, 352D, 352E, 352F, 352G, 352H, 352I, 352J, 352K, 352L and 352M, respectively, and each of the gate circuits has an input for a gating pulse which is electrically connected to the output of the delayed pulse generators 362.

Each of the photocells in the embodiment of FIG. 16 charges its respective capacitor 330A, 330B, 330C, 330D, 330E, 330F, 330G, 330H, 330I, 330J, 330K, 330L or 330M only in the event the photocell is illuminated. Only when the transistor switch associated with that photocell receives a pulse to short the switch in parallel with the photocell load resistor 328A, 328B, 328C, 328D, 328E, 328F, 328G, 328H, 328I, 328J, 328K, 328L or 328M, will a pulse appear across the load resistor associated with that photo-voltaic cell. The output appearing across the load resistor associated with each photo-voltaic cell is amplified, and discriminated in a separate channel in the manner indicated for the common channel of the embodiment of FIG. 14. The secondary negative pulse resulting from discharge of the capacity of the transistor switch is also gated in the discriminator and gate circuits 352A, 352B, 352C, 352D, 352E, 352F, 352G, 352H, 352I, 352J, 352K, 352L or 352M in response to a delayed pulse from the delayed pulse generator 362. In the particular embodiments set forth in FIG. 16, all of the electrical switches are closed in unison in response to a pulse from pulse generator 375 which is connected to each of the bases of transistors 334A, 334B, 334C, 334D, 334E, 334F, 334G, 334H, 334I, 334J, 334K, 334L and 334M. In like manner, the delayed pulse generator is interconnected with the pulse generator 374 to obtain synchronization.

In the embodiment of FIG. 16, each of the photocells has a separate output, as indicated by the terminals 370A and 372A. These outputs may be used to directly drive a display or associated equipment.

Those skilled in the art will readily appreciate other and additional uses and advantages of the invention herein disclosed, and also other applications for subcombinations of the present invention. It is therefore intended that the scope of the present invention be not limited by the foregoing specification, but only by the appended claims.

The invention claimed is:

1. An analog to digital encoder for encoding the rotational position of a shaft comprising a code member adapted to be mounted on the shaft and rotate therewith, said code member having at least one circular track adapted to be disposed coaxially about the shaft and said track having a plurality of transparent segments separated by opaque segments, a continuous source of light disposed in a fixed position relative to the code member on one side of the code member and confronting the track, a photo-voltaic cell having two output terminals disposed in a fixed position relative to the code member confronting the light source on the other side of the code member and confronting the track and light source, and means for periodically interrogating the photo-voltaic cell including a first resistor connected across the two output terminals of the photo-voltaic cell, a two terminal load resistor having the first terminal thereof electrically connected to the first output terminal of the photo-voltaic cell, a two terminal capacitor having the first terminal thereof connected to the second terminal of the photo-voltaic cell and the second terminal thereof connected to the second terminal of the load resistor, and a switch electrically connected across the first resistor for shorting the capacitor across the load resistor, whereby a pulse will be produced across the load resistor only if the photo-voltaic cell is illuminated.

2. An analog to digital encoder for encoding the rotational position of a shaft comprising the combination of claim 1 wherein the switch comprises an electrical circuit having a transistor connected in an emitter-collector circuit in parallel with the first resistor, and a pulse generator electrically coupled to the base of the transistor producing pulses of sufficient amplitude to saturate the transistor.

3. An analog to digital encoder for encoding the rotational position of a shaft comprising a code member adapted to be mounted on the shaft and rotate therewith, said code member having a plurality of circular tracks disposed coaxially relative to each other and adapted to be disposed coaxially about the shaft, each track of said code member having a plurality of transparent segments separated by opaque segments, a continuous source of light disposed in a fixed position relative to the code member on one side of the code member illuminating each track of the code member, a photo-voltaic cell having two output terminals disposed in a fixed position relative to the code member, and means for periodically interrogating each of the photo-voltaic cells including a plurality of first resistors, each of said first resistors being connected across the two output terminals of one of the photo-voltaic cells, a plurality of two terminal capacitors, each of said capacitors having the first terminal thereof connected to the first terminal of one of the photo-voltaic cells, at least one two terminal load resistor connected between the second terminal of each capacitor and the second terminal of the photo-voltaic cell associated with said capacitor, a plurality of electrical switches, each electrical switch being electrically connected across one of the first resistors for shorting the capacitor connected thereto across the load resistor coupled to said first resistor, and means associated with each of the electrical switches for periodically closing said switches.

4. An analog to digital encoder for encoding the rotational position of a shaft comprising the combination of claim 3 wherein a single load resistor is employed, and each of the electrical switches are closed in sequence.

5. An analog to digital encoder for encoding the rotational position of a shaft comprising the combination of claim 3 wherein a separate load resistor is electrically coupled to each photo-voltaic cell, and all of the electrical switches are closed in periodic unison.

6. An analog to digital encoder for encoding the rotational position of a shaft comprising the combination of claim 3 wherein each electrical switch has a capacity in parallel with its associated photocell, and in combination with a gate for each load resistor, each gate being electrically coupled to one load resistor and electrically connected between said load resistor and the output of the encoder, a pulse producing means coupled electrically to the electrical switch connected to the photo-voltaic cell associated with said load resistor for producing a pulse delayed from the time of closing of the switch and prior to discharge of the capacity of said switch, said pulse producing means being electrically connected to the gate and the gate isolating the output of the encoder during the pulses from the pulse producing means.

7. An analog to digital encoder for encoding the rotational position of a shaft comprising the combination of claim 4 wherein each electrical switch has an internal capacity in parallel with its associated photocell, and in combination with a gate electrically connected between the load resistor and the output of the encoder, a pulse producing means electrically synchronized with the electrical switch for producing a pulse delayed from the time of closing of the switch and prior to discharge of the capacity of said switch, said pulse producing means being electrically connected to the gate and the gate isolating the output of the encoder during pulses from the pulse producing means.

8. An analog to digital encoder for encoding the rotational position of a shaft comprising the combination of claim 3 in combination with a discriminator electrically connected to the load resistor for generating standard pulses, a delayed pulse generator electrically synchronized with the means for periodically closing the switches, each of said switches having an internal capacity in parallel with the photo-voltaic cell associated therewith, and a gate electrically coupled to the discriminator and to the delayed pulse generator, said gate interrupting the output of the encoder during periods of a pulse from the delayed pulse generator, and the delayed pulse generator generating a pulse during each period of a pulse due to discharge of the internal capacity of a switch.

9. An analog to digital encoder for encoding the rotational position of a shaft comprising the combination of claim 8 wherein the discriminator has a first and a second transistor, each transistor having a base, a collector and an emitter, the base of the first transistor being coupled electrically to the load resistor and the output of the discriminator appearing on the collector of the second transistor, the emitters of the first and second transistors being electrically interconnected and the base of the second transistor being coupled to the collector of the first transistor, and the gate including a diode connected to the base of the second transistor for passing pulses from the delayed pulse generator to the base, said pulses saturating the second transistor.

10. An optical encoder comprising a plurality of photo-resistive cells, each cell having two electrodes and a mass of photo-conductive material disposed between the electrodes, a code disc having a plurality of coaxial tracks disposed about the center thereof, each track consisting of a series of alternating segments of transparent material and segments of opaque material, means for mounting the photocells adjacent to one side of the code disc with a photocell confronting each track of the code disc, a light source disposed on the opposite side of the code disc from the photocells, and means for determining the presence of illumination on each of the photocells of the encoder in time sequence comprising a common output terminal electrically connected to one electrode of each cell, a first two terminal diode having its first terminal connected to the other electrode of each photocell to pass positive charges in one direction relative to said electrode, an even plurality of two terminal diodes having their second terminals electrically connected to the second terminal of each first diode, each of said plurality of diodes passing positive charges in a direction opposite that of the first diode, a direct current potential source having one terminal electrically connected to the one electrode of each of the photocells, a plurality of balancing resistors, one balancing resistor being connected between the other electrode of each photocell and the other terminal of the potential source, and a plurality of flip-flops equal in number to the number of diodes in each plurality connected in cascade, each flip-flop having a common terminal electrically connected to the other terminal of the potential source and two output terminals, said flip-flops having a first stable state in which the impedance from one output terminal to the common terminal is low and the impedance from the other output terminal to the common terminal is high and a second stable state in which the reverse impedance conditions exist, and means electrically connecting the first terminal of one of the diodes of each plurality to one of the output terminals of each flip-flop and insulating each said first terminal from all other flip-flops, said means connecting said plurality of diodes and flip-flops so that the first terminals of only one plurality of diodes are connected to output terminals at a high impedance to the common terminal at a given time.

11. An optical encoder comprising the combination of claim 10 wherein the first electrode of each of the photocells and the first terminal of the power source are maintained at a potential relative to the common electrodes of the flip-flops.

12. An optical encoder comprising the combination of claim 10 wherein the code disc contains thirteen code carrying tracks, four diodes are disposed in each plurality of diodes, and four flip-flops are employed.

13. An optical encoder comprising the combination of claim 10 in combination with an amplifier electrically connected to the common output terminal of the photocells.

14. An analog to digital encoder comprising a housing having a generally cylindrical wall, a shaft disposed on the axis of the wall, a pair of bearing assemblies mounted on the housing and mounted about the shaft to journal the shaft on the housing, a code disc disposed within the cylindrical wall and mounted on the shaft for rotation therewith, said code disc having a diameter slightly less than the diameter of the cylindrical wall and a plurality of circular track coaxially disposed about the shaft, each track of the code disc consisting of a plurality of transparent sectors separated by opaque sectors, a plurality of photocells mounted on the housing on one side of the code disc, each photocell confronting a different track of the code disc and having two electrodes and a mass of photo-electric material therebetween, and a light source disposed within the wall on the other side of the code disc confronting the photocells, a plurality of balancing resistors mounted within the wall of the housing between the bearing assemblies and the wall, said wall having a plurality of channels therein equal to the number of balancing resistors disposed parallel to the axis of the wall and communicating at opposite ends with the regions within the housing on opposite sides of the code disc, a plurality of electrical connectors, each connector being connected at one end to one of the balancing resistors, extending through one of the channels of the wall and being connected at the other end to one of the photocells, an electronic interrogation unit for the photocells mounted on the housing on the side of the photocells opposite the code disc, said interrogation unit having a plurality of output terminals equal in number to the number of photocells and comprising a plurality of flip-flops, each having an input terminal, two output terminals, and a common terminal, one of the input terminals of all but one of the flip-flops being connected to the output terminal of another flip-flop to form a multistage counter, one of the output terminals of each flip-flop being at a high impedance relative to the common terminal when the other output terminal is at a low impedance relative to the common terminal, a source of direct current potential having one terminal connected to the common terminal of each flip-flop and another terminal connected to a plurality of resistors, each resistor being connected to an output terminal through a first diode connected in series with the resistor, each first diode being connected to pass charges from said terminal to the output terminal connected thereto, a plurality of groups of diodes, each group having a plurality of diodes having one terminal electrically interconnected and connected to the junction between one of the resistors and the first diode connected thereto, the other terminal of each of the diodes in each group being connected to one of the output terminals of a flip-flop, each of said diodes in a group being connected to a different flip-flop, and one of the groups of diodes being connected only to high impedance outputs of the flip-flop at any given time, and a periodic pulse generator electrically connected to the input terminal of the one flip-flop, and the wall of the housing having a plurality of ducts extending therethrough parallel to the axis of the wall from the region of the interrogation unit to the region of the balancing resistors, and an electrical connector disposed in each of the ducts and electrically connected at one end to one of the balancing resistors and at the other end to one of the output terminals of the interrogation unit.

15. A digital shaft angle encoder comprising a code member adapted to be mounted on the shaft and rotate therewith having a plurality of circular tracks disposed coaxially about the shaft, each track of said code member having a plurality of transparent segments separated by opaque segments, a continuous source of light disposed on one side of the member illuminating each track of the code member, a photo-voltaic cell having two output terminals confronting each track of the code member on the side of the code member opposite the light source, and means for periodically interrogating each of the photo-voltaic cells including a plurality of first resistors, each of said first resistors being connected across the two output terminals of one of the photo-voltaic cells, a plurality of two terminal capacitors, each of said capacitors having the first terminal thereof connected to the first terminal of one of the photo-voltaic cells, at least one two-terminal lead resistor connected between the second terminal of each capacitor and the second terminal of the photo-voltaic cell associated with said capacitor, a plurality of electrical switches, each electrical switch being electrically connected across one of the first resistors for shorting the capacitor connected thereto across the load resistor coupled to said first resistor, whereby a pulse will be produced across said load resistor only if the photo-voltaic cell is illuminated, and a sequential pulse generator having a plurality of output terminals, said sequential pulse generator producing a pulse in sequence on each output terminal thereof in each operative cycle, each of the electrical switches being electrically connected to a different output terminal of the sequential pulse generator.

References Cited

UNITED STATES PATENTS

| | | | |
|---|---|---|---|
| 2,956,171 | 10/1960 | Winder et al. | 307—299 X |
| 3,023,406 | 2/1962 | Jones | 340—347 |
| 3,169,212 | 2/1965 | Walters | 320—1 X |
| 3,205,491 | 9/1965 | Brown et al. | 340—347 |
| 3,276,010 | 9/1966 | Mountjoy | 340—347 |
| 3,297,910 | 1/1967 | Gershen | 250—206 X |

MAYNARD R. WILBUR, Primary Examiner

G. R. EDWARDS, Assistant Examiner